United States Patent

[11] 3,600,046

| [72] | Inventor | John W. Redmon<br>Huntsville, Ala. |
|---|---|---|
| [21] | Appl. No. | 865,298 |
| [22] | Filed | Oct. 10, 1969 |
| [45] | Patented | Aug. 17, 1971 |
| [73] | Assignee | The United States of America as represented by the Administrator of the National Aeronautics and Space Administration |

[54] AIR BEARING ASSEMBLY FOR CURVED SURFACES
4 Claims, 9 Drawing Figs.

[52] U.S. Cl. ................................................ 308/5, 212/134
[51] Int. Cl. ................................................ F16c 17/00
[50] Field of Search ................................... 308/DIG. 1, 5, 9; 104/134; 212/14, 15, 10, 22, 134, 128; 287/60

[56]            References Cited
            UNITED STATES PATENTS
| 3,252,589 | 5/1966 | Keen et al. | 212/20 |
| 3,432,040 | 3/1969 | Van Gaasbeck | 212/134 |
| 3,498,652 | 3/1970 | Cass | 287/60 |
| 3,513,987 | 5/1970 | Seyff | 212/128 |

Primary Examiner—Martin P. Schwadron
Assistant Examiner—R. H. Lazarus
Attorneys—L. D. Wofford, Jr., Charles C. Wells and G. T. McCoy ABSTRACT: The invention is a journal type air bearing wherein a cylindrical bearing member or cup is designed to ride or float on a shaft. The bearing is split into two parts or halves that each have a round groove cut therein that conforms to the shape of the shaft and are connected by an adjustment mechanism that maintains a particular spacing between the two bearing halves. Each bearing half has an air manifold connected to a source of pressurized air so that an air film or gap can be maintained between the surface of the round groove in the bearing half and the surface of the shaft. Two pairs of elongated links are pivotally connected at one of their ends to the bearing, one pair to each bearing half. The other end of the links are connected to a load bearing support member.

PATENTED AUG 17 1971 3,600,046

INVENTOR
JOHN W. REDMON

BY
Charles C. Wells
ATTORNEYS

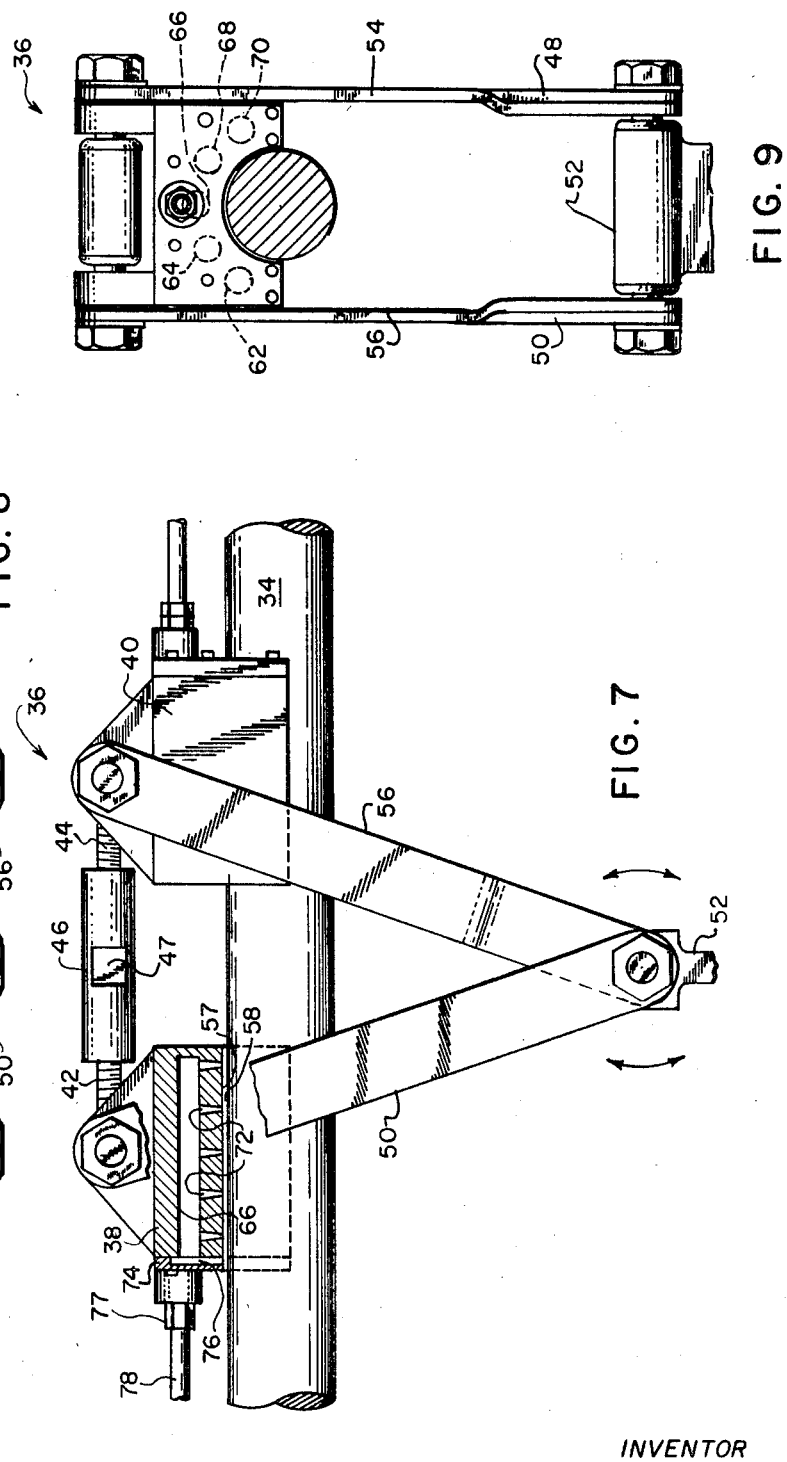

AIR BEARING ASSEMBLY FOR CURVED SURFACES

ORIGIN OF THE INVENTION

The invention described herein was made by an employee of the United States Government and may be manufactured and used by or for the Government of the United States of America for Governmental purposes without the payment of any royalties thereon or therefor.

BACKGROUND OF THE INVENTION

The invention relates in general to air bearings wherein two bearing surfaces are separated by a thin air film so as to provide extremely low friction between the two surfaces when relative movement occurs therebetween. More particularly the invention relates to journal type air bearings wherein a bearing member in the form of a shaft floats on a bearing member such as a shaft.

In the design of air bearings, particularly journal type air bearings, it is necessary that the load bearing parts be designed so as to be rigid when subjected to varying loads. Unless rigidity of the bearing parts is provided the air gap between the bearing surfaces becomes irregular and interference between the bearing surfaces occurs. For example, in the case of a conventional gas-lubricated journal bearing like that shown in the drawings, wherein a cylindrical bearing member or cup is supported on a shaft; it is necessary to design the shaft so that it has sufficient strength to support the load carried by the cylindrical bearing member without undue deflection. As is readily apparent from the drawings, there can be sufficient deflection of the shaft to result in contact between the bearing surface of the shaft and the extreme ends of the cup. When this occurs the bearing is said to "bottom out" and binding occurs.

In designing bearings of this type heretofore the remedy for this problem has been to make the load bearing parts strong enough to support a load without objectionable deflection. A large diameter shaft would of course require a larger cup and bearing weight would increase. Weight is normally not critical, but in the design and fabrication of structures for use in space the question of weight becomes very important and conventional design techniques and methods that do not treat weight as a critical factor are not adequate.

SUMMARY OF THE INVENTION

An object of the present invention is to provide a journal type air bearing having a low ratio of bearing weight to bearing load carrying capability. By this it is meant that the present invention provides a bearing capable of carrying a heavy load yet it is a relatively lightweight bearing.

Another object of the invention is to provide an air bearing wherein the bearing member is constructed in two parts that are held in a predetermined spaced position by an adjustment mechanism and the load supported by the bearing is equally distributed to the two spaced bearing parts.

The present invention accomplishes these and other desired objects by utilizing a journal type air bearing comprised of two interconnected bearing halves or cups supported on a shaft. Each bearing half has a groove formed therein that conforms to the shape of the supporting shaft and the surface of this groove along with the surface of the shaft forms the bearing surfaces of the assembly.

An air film is provided between adjacent bearing surfaces of the bearing halves and the shaft by means of a manifold arrangement formed in each of the bearing halves. These manifolds are connected to an external source of pressurized air. Spacing between the two bearing halves is maintained by an adjustable connection which permits varying of the spacing between bearing halves and pivotal movement of each bearing half relative to the other bearing half. A linkage is pivotally connected to each of the bearing halves and arranged for connection to a load so that the load is equally supported by each of the bearing halves.

The advantage of this construction is that the bearing half can move on the shaft even when the shaft is deflected; so long as the shaft curvature under each bearing half does not exceed that permitted by the air gap between the bearing half and the shaft. It will become apparent from a consideration of the following detailed description and drawings that a solid bearing having a bearing surface equal to that of a split bearing will accommodate considerably less shaft curvature than will a split bearing. Thus, a bearing constructed in accordance with the present invention can support a given load with a smaller shaft and bearing member or cup than could a one-piece air bearing having an equal bearing surface.

BRIEF DESCRIPTION OF THE DRAWINGS

FIG. 7 is a side view, partially in section, of a split journal type air bearing.

FIG. 8 is a top view of the air bearing shown in FIG. 7.

FIG. 9 is an end view of the air bearing illustrated in FIG. 7.

DETAILED DESCRIPTION OF THE INVENTION

Figure 1:
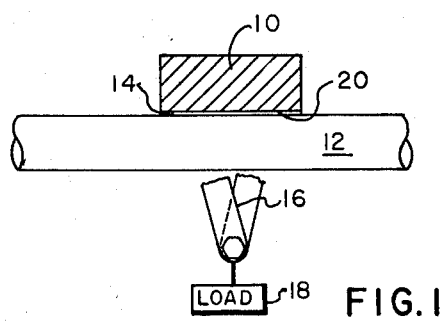
FIG. 1 is a sectional view taken along line 1–1 of FIG. 2 which illustrates a conventional journal air bearing utilizing a one-piece bearing member as the floating bearing member.
Figure 2:
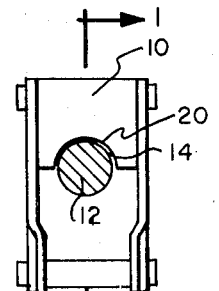
FIG. 2 is an end view of a conventional journal air bearing in which the shaft supporting the floating bearing member is substantially straight.

In FIGS. 1 through 6 a comparison of conventional bearings with one constructed in accordance with this invention is made by an exaggerated schematic illustration. The journal air bearing shown in FIG. 1 consists of a floating bearing member or cup 10 mounted on a shaft 12 and separated therefrom by an air gap 14 which is maintained by a suitable manifold arrangement (not shown) formed in the floating bearing member and connected to an external source (not shown) of pressurized air. Linkage 16, shown broken away, is connected to the floating bearing member 10 and has a load 18 suspended therefrom. Shaft 12 in this illustration is straight and the air gap between bearing surface 20 of floating member 10 and the outer surface of shaft 12 is uniform all along the length of the floating bearing member. In this condition, there is no engagement of the bearing surface 20 with the outer surface of shaft 12 and, as more clearly shown in FIG. 2, the air gap between bearing member 10 and shaft 12 is maintained at the extremities of the floating member.

Figure 3:
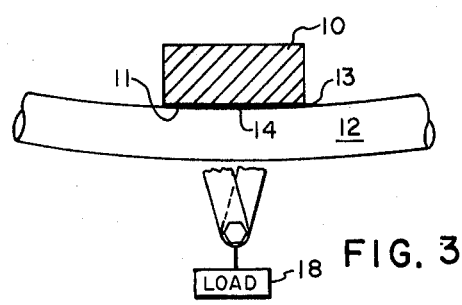
FIGS. 3 and 4 are the same as FIGS. 1 and 2 except that the shaft has been deflected so that the extremities of the floating bearing member are in contact with the outer surface of the shaft.
Figure 4:
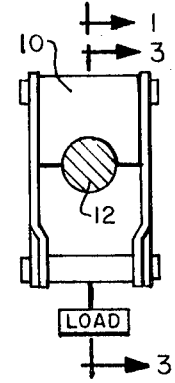

Shaft 20 would normally be supported at the ends thereof (not shown) and deflection of shaft 12 because of overloading results in the condition illustrated in FIGS. 3 and 4. Here the longitudinal axis of shaft 12 is curved and the air gap between the floating bearing member and the shaft is no longer uniform. In the exaggerated situation shown in FIG. 3 the end portions 11 and 13 of bearing surface 14 are in actual binding contact with the outer surface of shaft 12.

It is apparent from a consideration of FIGS. 1 through 4 that the amount of shaft deflection that can be tolerated is dependent upon the length of the floating bearing member and the air gap between the shaft and floating bearing member. A proper relationship between bearing length and permissible curvature of the shaft is required in order to avoid bottoming out of the floating bearing member. The customary way of doing this is to make shaft 12 large and strong enough to avoid objectionable deflection thereof. This of course increases the weight of both the floating bearing member and the shaft.

Figure 5:
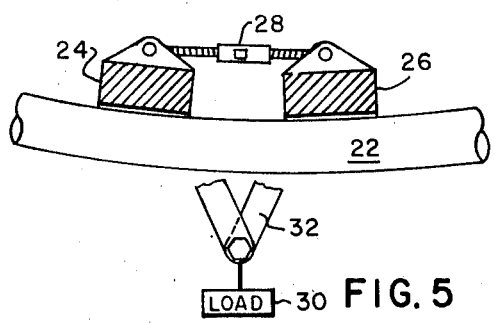
FIG. 5 is a sectional view of a split air bearing taken along lines 5–5 of FIG. 6.
Figure 6:
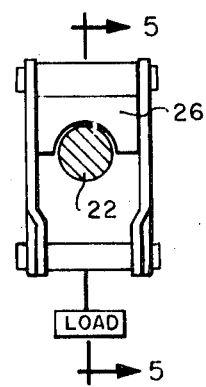
FIG. 6 is an end view of a two-part air bearing.

In the bearing shown in FIGS. 5 and 6, increased shaft curvature is accommodated by subdividing the required bearing length into two shorter bearings which are movably interconnected so as to allow satisfactory conformity to the curved shaft. The split bearing shown in FIG. 5 consists of a shaft 22 and two floating bearing members or cups 24 and 26 held in a spaced position by an adjustment mechanism 28 connected therebetween. A load 30 is suspended from a linkage 32 connected to bearing members 24 and 26 so that the load is equally supported by the two bearing members. It is apparent that the effective bearing length of the split bearing shown in FIG. 5 insofar as it tends to cause binding between the bearing surfaces is considerably less than that of the solid bearings shown in FIGS. 1 and 3. It is likewise apparent that the effective bearing surface area of the split bearing is just as great as it would have been had the two halves been joined into a single integral bearing member. In other words, by splitting the bearing into two halves the length that determines whether or not binding will occur is the length of one bearing half. A shorter bearing length will permit more shaft curvature before binding occurs and thus is desirable.

Referring now to FIGS. 7 through 9 which show the details of a bearing constructed in accordance with this invention. Only a portion of shaft 34 is shown, but it is understood that the ends thereof are supported in a suitable manner and that floating bearing part 36 can be moved along the longitudinal length of shaft 34 and also it can pivot about the longitudinal axis thereof. Bearing part 36 is comprised of two bearing halves or cups 38 and 40 which are substantially identical and therefore only one will be later described. Bearing halves 38 and 40 are connected by an adjustment mechanism consisting of an externally threaded shaft 42 extending from a collar 43 that is pivotally connected to bearing half 38. A second externally threaded shaft 44 extends from a collar 45 pivotally connected to bearing half 40. The pivotal mounting of the adjustment mechanism allows the bearing halves to rotate relative to one another and fine their own level on the shaft independently of each other. The angular position of the bearing halves will be different when they are on a deflected shaft. These two shafts are threaded into an internally threaded sleeve 46. The threads on shafts 42 and 44 are opposite from one another so that rotation of sleeve 46 will result in the bearing halves being moved either apart or together. Flats 47 have been formed on sleeve 46 to facilitate turning of the sleeve with a wrench.

A pair of links 48 and 50 (see FIG. 8) are pivotally connected at one of their ends to bearing half 38 and the other end is pivotally connected to a bracket 52 or other suitable member from which a load can be suspended. A similar pair of links 54 and 56 are pivotally mounted at one of their ends to bearing half 40 and at their other end connected to bracket 52. The end result of this arrangement is that a load suspended from bracket 52 is equally supported by bearing halves 38 and 40.

Bearing half 38 has a round groove formed in the bottom thereof that conforms to the shaft 34 and the surface of this groove forms a bearing surface 57. The bearing half is floated on shaft 34 by a cushion of air in air gap 58 between bearing surface 57 and the outer surface of shaft 34. This cushion of air is provided by means of a manifold arrangement consisting of five blind bores 62, 64, 66, 68 and 70 shown in phantom lines in FIG. 9. The axes of the blind bores are parallel to the axis of the round groove and positioned concentrically thereabout. Each of these bores has a plurality of ports 72 that provides passageways between the interior of these bores and air gap 58, as clearly shown in FIG. 7. Each bearing half has an end cap, like end cap 74 of bearing half 38, that is mounted over the end of the bearing half. The end cap has a cavity 76 formed therein that is in communication with each of the five bores in the bearing half so that air pressure admitted to the end cap via connection 77 and pneumatic line 78 can be distributed to the five bores and from there to air gap 58 by means of ports 72.

It is apparent from the foregoing discussion that the bearing halves are capable of pivotal movement relative to another as a load is moved along shaft 34. This coupled with the use of two bearing halves rather than a single integral floating bearing member reduces the effective length of the bearing to that of one bearing half. Thus, so long as the shaft curvature under one bearing half is not enough to cause contact between the bearing surfaces at the ends of the bearing half, then binding between the bearing surfaces will not occur.

What I claim is:

1. An air bearing assembly for supporting a movable load on a load bearing member wherein the effective length of the bearing has been reduced without a reduction in bearing surface area, said bearing assembly comprising:

a first air bearing half movably mounted on said load bearing member;

a second air bearing half moveably mounted on said load bearing member in a position adjacent said first bearing half;

adjustable means connected between said first and second bearing halves for maintaining a particular spacing therebetween; and linkage means pivotally connected to said first and second bearing halves and constructed and arranged for single point connection to a load whereby the load is supported equally by said first and second bearing halves, said linkage means comprising:

a first pair of links pivotally connected at one of their ends to said first bearing half;

a second pair of links pivotally connected at one of their ends to said second bearing half; and bracket means for pivotally connecting said first and second pair of links at their other ends and for supporting a load from a single point.

2. The bearing assembly recited in claim 1 wherein:

said first and second bearing halves are journal type air bearings, and said load bearing member is a round shaft.

3. The bearing assembly recited in claim 2 wherein each of said first and second bearing halves includes:

an open sided round groove formed on one side of each bearing half that provides a bearing surface that conforms to the shape of the load bearing shaft, a plurality of spaced blind holes formed in each bearing half that are positioned in a spaced relation around the periphery of said round groove such that the longitudinal axis of said blind holes are parallel to and concentrically arranged with the longitudinal axis of said round groove, a plurality of ports formed in said bearing half that are spaced along the length of said blind holes and connect said blind holes and said round groove; and an end cap that covers the open end of said blind holes, said end cap being slightly recessed to define a cavity that is in communication with the blind holes to form a manifold, said end cap including a connector means adapted to be connected to a source of pressurized air for supplying pressurized air to the manifold.

4. The bearing assembly recited in claim 3 wherein the adjustable means for maintaining a desired spacing between the bearing halves comprises:

an internally threaded cylinder, a first threaded member pivotally connected to one of said bearing halves and threaded into one end of said cylinder, a second threaded member pivotally connected to the other bearing half and threaded into the other end of said cylinder, said first and second threaded members being oppositely threaded so that rotation of said cylinder will cause the bearings halves to move with respect to each other.